United States Patent
Nam et al.

(10) Patent No.: US 8,050,356 B2
(45) Date of Patent: Nov. 1, 2011

(54) TRANSMISSION APPARATUS AND METHOD FOR MIMO SYSTEM

(75) Inventors: Seung-Hoon Nam, Seoul (KR); Chan-Soo Hwang, Yongin-si (KR); Jae-Hak Chung, Seoul (KR); Young-Ho Jung, Seoul (KR); Won-Il Roh, Yongin-si (KR); Chan-Byoung Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 11/345,717

(22) Filed: Feb. 2, 2006

(65) Prior Publication Data

US 2006/0215784 A1     Sep. 28, 2006

(30) Foreign Application Priority Data

Feb. 2, 2005   (KR) .................. 10-2005-0009561

(51) Int. Cl.
*H04L 27/00*     (2006.01)
(52) U.S. Cl. ........ 375/299; 375/267; 455/101; 455/103
(58) Field of Classification Search .................. 375/299, 375/295, 259–261, 267, 268, 271, 279–281, 375/284–285, 302, 308; 455/91, 101, 103, 455/110
See application file for complete search history.

(56) References Cited

U.S. PATENT DOCUMENTS

| | | | |
|---|---|---|---|
| 6,510,173 B1 | 1/2003 | Garmonov et al. | |
| 6,661,856 B1 * | 12/2003 | Calderbank et al. | 375/347 |
| 2003/0067993 A1 * | 4/2003 | Viswanathan | 375/267 |
| 2003/0220122 A1 * | 11/2003 | Lim et al. | 455/522 |
| 2006/0093057 A1 * | 5/2006 | Zhang et al. | 375/267 |
| 2006/0262714 A1 | 11/2006 | Tarokh et al. | |

FOREIGN PATENT DOCUMENTS

| | | |
|---|---|---|
| CN | 1322412 A | 11/2001 |
| CN | 2613104 Y | 4/2004 |
| EP | 0 929 161 | 7/1999 |
| KR | 10-2004-0074325 | 8/2004 |
| WO | WO 03/047032 A1 | 6/2003 |
| WO | WO 03/058905 | 7/2003 |
| WO | WO 2004/002010 | 12/2003 |
| WO | WO 2005/006696 | 1/2005 |

OTHER PUBLICATIONS

Chinese Office Action issued on Dec. 11, 2009, in counterpart Chinese Application No. 2006100033087 (12 pages, in Chinese, with English translation of text of Chinese Office Action).
Extended European Search Report issued on Mar. 13, 2006, in counterpart European Application No. 06002179.7 (7 pages).
Korean Office Action issued on Mar. 15, 2011, in corresponding Korean Application No. 10-2005-0009561 (3 pages).

* cited by examiner

*Primary Examiner* — Dac Ha
*Assistant Examiner* — James M Perez
(74) *Attorney, Agent, or Firm* — NSIP Law

(57) ABSTRACT

A transmitter in a multiple input multiple output (MIMO) communication system is provided. The transmitter includes a multiplexer for multiplexing an input bit stream into a plurality of bit streams, and outputting the bit streams in parallel; a bit-order rearranger for reordering bits constituting the bit streams, which are output from the multiplexer in the same time period, and outputting the reordered bits as reordered bit streams; and a modulator for modulating the parallel reordered bit streams output from the bit-order rearranger according to their associated modulation schemes, and transmitting the modulated symbols via their associated antennas.

20 Claims, 3 Drawing Sheets

… (1)

TRANSMISSION APPARATUS AND METHOD FOR MIMO SYSTEM

PRIORITY

This application claims the benefit under 35 U.S.C. § 119(a) of an application entitled "Transmission Scheme for MIMO System" filed in the Korean Intellectual Property Office on Feb. 2, 2005 and assigned Serial No. 2005-9561, the entire contents of which are incorporated herein by reference.

BACKGROUND OF THE INVENTION

1. Field of the Invention

The present invention relates generally to a wireless communication system, and in particular, to a transmission scheme for a Multiple Input Multiple Output (MIMO) communication system.

2. Description of the Related Art

In a MIMO communication system that transmits/receives data using a plurality of transmission antennas and reception antennas, a MIMO channel formed by the transmission and reception antennas is disassembled into a plurality of independent spatial channels. Each of the spatial channels is mapped to one dimension, and the use of additional dimensions created by the multiple transmission and reception antennas improves performance of the MIMO system.

In a wireless communication system, transmission data forms a symbol stream through a coding and modulation process, and the symbol stream is phase-shifted into a radio frequency (RF) modulated signal that is suitable to be transmitted over a wireless channel.

A data transmission scheme using the MIMO system is classified into a Spatial Multiplexing (SM) scheme and a Spatial Diversity (SD) scheme. The SM scheme simultaneously transmits different data using multiple transmission antennas, thereby transmitting data at a high rate without increasing a bandwidth of the system. The SD scheme transmits single data stream via multiple transmission antennas, thereby obtaining transmit diversity gain.

FIG. 1 is a block diagram illustrating a structure of a transmitter based on a Bell Labs LAyered Space-Time (BLAST) scheme, which is the conventional SM scheme. An input bit stream is multiplexed into four parallel bit streams $S_1, S_2, S_3$ and $S_4$ by a multiplexer (MUX) 101. The individual bit streams $S_1, S_2, S_3$ and $S_4$ are modulated into modulation symbols $X_1, X_2, X_3$ and $X_4$ according to a modulation technique of their associated modulators 103, and then transmitted through four associated transmission antennas. In this case, the modulation technique is a quadrature phase shift keying (QPSK) scheme. In the BLAST scheme, multiplexing gain is in proportion to the number of transmission antennas and reception antennas. However, the BLAST scheme, as it provides no diversity gain, there is a decrease in bit error rate (BER) performance in a high signal-to-noise ratio (SNR) environment, and it suffers an abrupt change in performance depending on the type of receiver and transmission optimization technique.

FIG. 2 is a block diagram illustrating a structure of a transmitter based on a Double Space-Time Transmit Diversity (DSTTD) scheme, which is the conventional SD scheme. Modulation symbols $X_1, X_2, X_3$ and $X_4$ modulated through the process of FIG. 1 are pre-coded by a transmission matrix of a pre-encoder 105 before being transmitted. The transmission matrix has a form defined by Equation (1):

$$B = \begin{bmatrix} x_1 & x_2 & x_5 & x_6 \\ x_2^* & -x_1^* & x_6^* & -x_5^* \\ x_3 & x_4 & x_7 & x_8 \\ x_4^* & -x_3^* & x_8^* & -x_7^* \end{bmatrix} \quad (1)$$

The DSTTD scheme using the 4×4 transmission matrix shown in Equation 1 has both a multiplexing gain of 2 and a diversity gain of 2, thus contributing to performance improvement, but results in a decrease in data rate due to the reduction in the multiplexing gain.

For improvement in system performance, the MIMO system has recently been designed so as to support at least one of the SM techniques and the SD techniques. In this scheme, a particular transmission technique is selected in a given time period according to channel conditions and required results.

However, because a transmission technique for spatial multiplexing and a transmission technique for spatial diversity are different from each other in design, supporting both of the transmission techniques for spatial multiplexing and spatial diversity within one system causes an increase in complexity of transceivers.

SUMMARY OF THE INVENTION

The present invention is provided to substantially solve at least the above problems and/or disadvantages. It is, therefore, an object of the present invention to provide a transmission apparatus and method for improving multiplexing gain while maintaining the diversity gain available in the conventional spatial diversity technique, through a simple coding process.

It is another object of the present invention to provide a transmission apparatus and method for adjusting diversity gain through modification of a bit/symbol mapping pattern.

It is further another object of the present invention to provide a transmission apparatus and method for improving multiplexing gain and adjusting diversity gain without increasing complexity of a decoder.

It is still another object of the present invention to provide a transmission apparatus and method for maximizing system performance by adjusting multiplexing gain and diversity gain according to environment, without increasing complexity.

According to one aspect of the present invention, there is provided a transmitter in a multiple input multiple output (MIMO) communication system. The transmitter includes a multiplexer for multiplexing an input bit stream into a plurality of bit streams, and outputting the bit streams in parallel; a bit-order rearranger for reordering bits constituting the bit streams, which are output from the multiplexer in the same time period, and outputting the reordered bits as reordered bit streams; and a modulator for modulating the parallel reordered bit streams output from the bit-order rearranger according to their associated modulation schemes, and transmitting the modulated symbols via their associated antennas.

According to another aspect of the present invention, there is provided a transmission method in a multiple input multiple output (MIMO) communication system. The method includes multiplexing a serial input bit stream into parallel symbols, which are output in the same time period; generating reordered bit streams by reordering bits constituting the parallel output symbols; and modulating the reordered bit streams according to their associated modulation schemes, and simultaneously transmitting the modulated symbols via their associated antennas.

According to further another aspect of the present invention, there is provided a transmission method in a multiple input multiple output (MIMO) communication system. The method includes multiplexing a serial input bit stream and outputting four symbols in the same time period; mapping the four symbols in units of two symbols; generating four reordered bit streams by reordering bits constituting the reordered bit streams; and modulating the generated four reordered bit streams according to their associated modulation schemes and simultaneously transmitting the modulated symbols via their associated transmission antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENT

A MIMO transmission apparatus and method according to the present invention will now be described with reference to the accompanying drawings.

Figure 1:
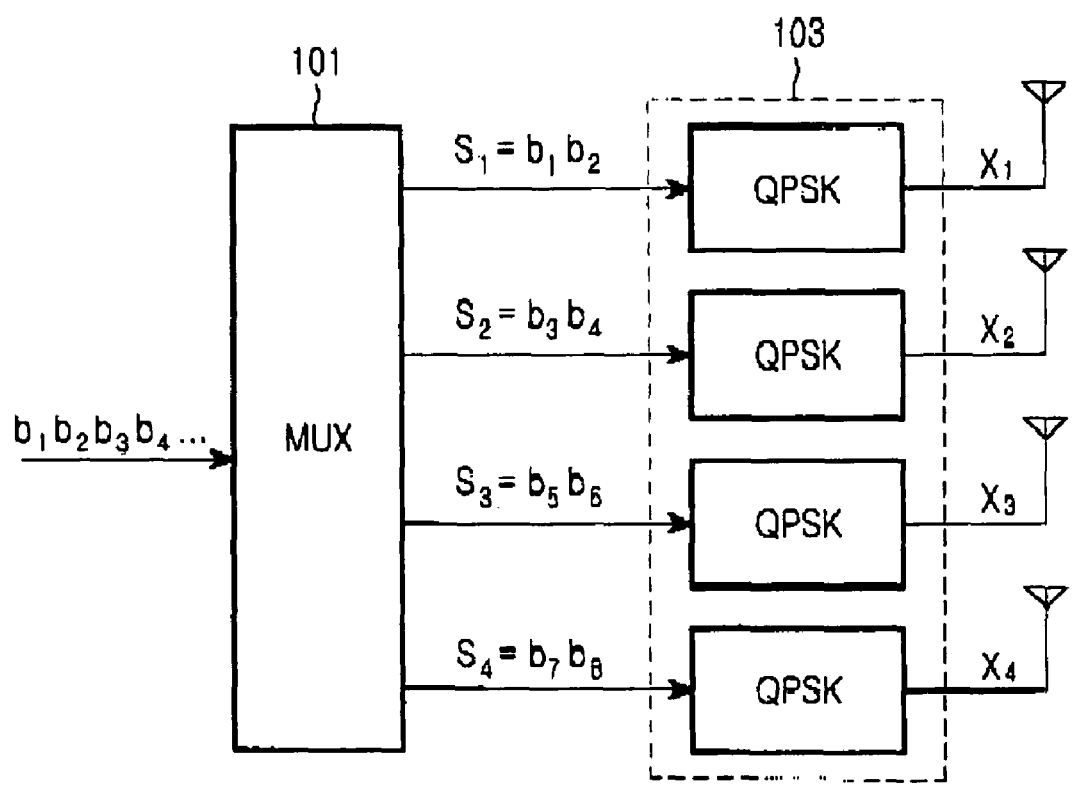
FIG. 1 is a block diagram illustrating a structure of a transmitter based on a Bell Labs Layered Space-Time (BLAST) scheme which is the conventional spatial multiplexing scheme.
Figure 2:
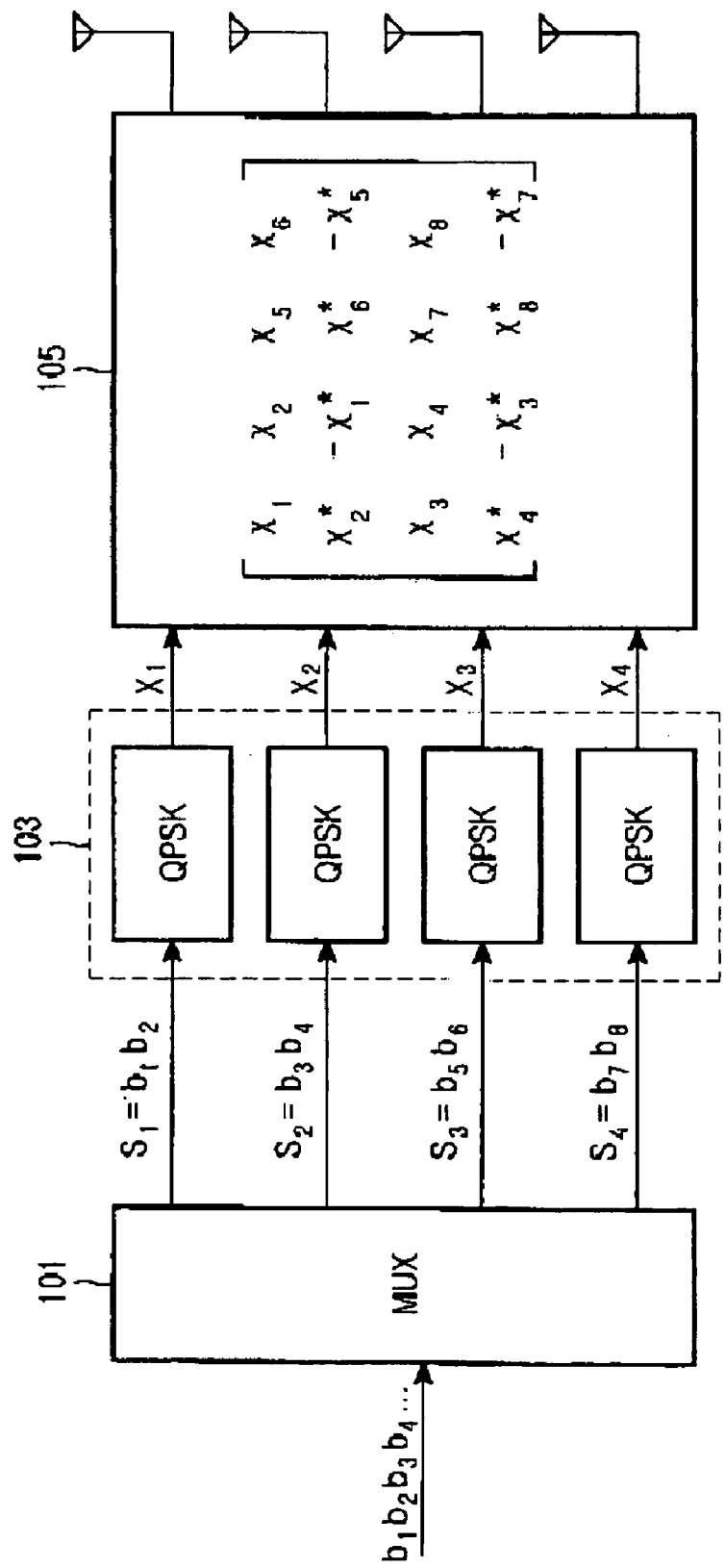
FIG. 2 is a block diagram illustrating a structure of a transmitter based on a Double Space-Time Transmit Diversity (DSTTD) scheme which is the conventional spatial diversity scheme.
Figure 3:
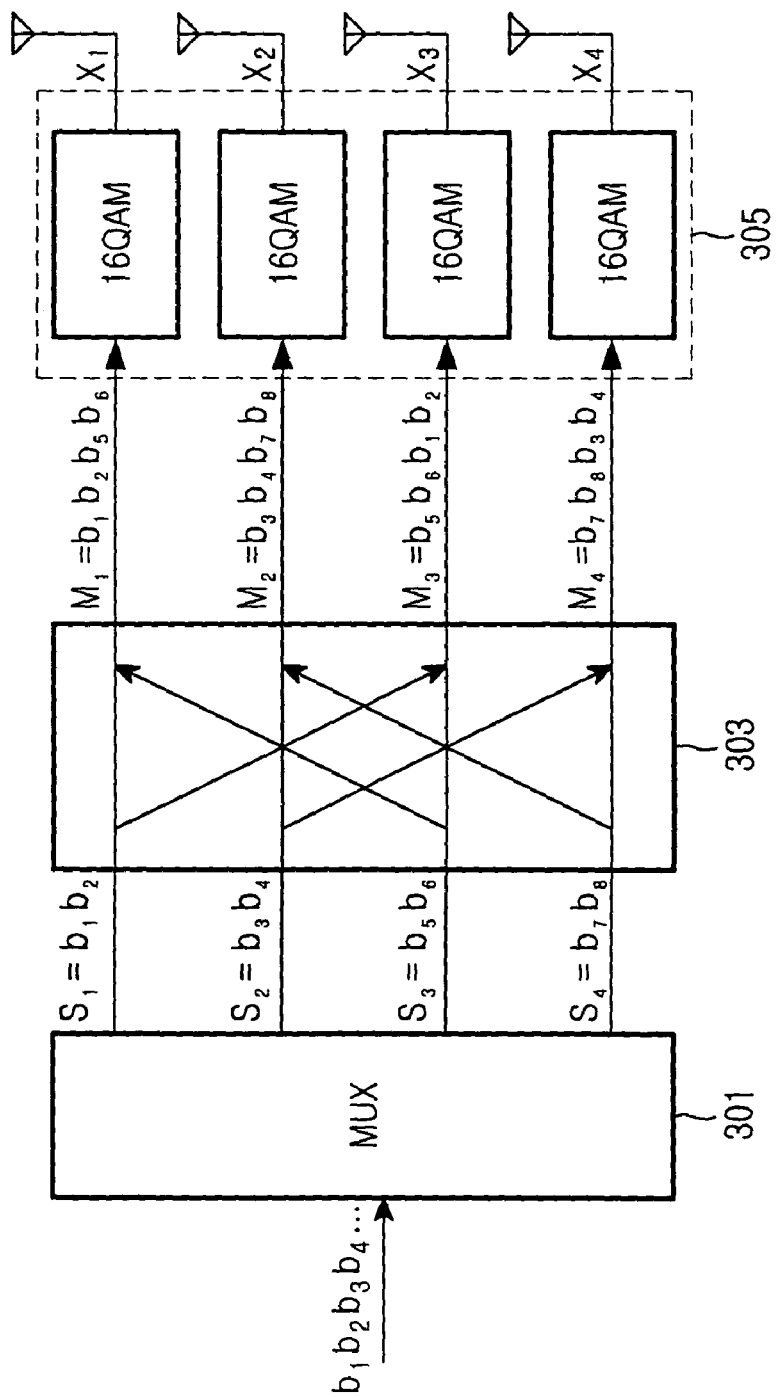
FIG. 3 is a block diagram illustrating a structure of a Multiple Input Multiple Output (MIMO) transmitter according to the present invention.

FIG. 3 is a block diagram illustrating a structure of a MIMO transmission apparatus according to the present invention. As illustrated in FIG. 3, a MIMO transmission apparatus according to the present invention includes a multiplexer 301 for multiplexing an input bit stream $b_1, b_2, b_3, b_4, \ldots$ into a plurality of parallel bit streams $S_1, S_2, S_3,$ and $S_4$, a bit-order rearranger 303 for reordering bits constituting the parallel bit streams into a plurality of reordered bit streams $M_1, M_2, M_3,$ and $M_4$, and a plurality of modulation modules 305 for modulating the reordered bit streams $M_1, M_2, M_3,$ and $M_4$ into transmission symbols $X_1, X_2, X_3$ and $X_4$ using a predetermined modulation technique and transmitting the transmission symbols $X_1, X_2, X_3$ and $X_4$ via their associated transmission antennas. The transmission symbols $X_1, X_2, X_3$ and $X_4$ may be pre-coded through a transmission matrix before being transmitted. Preferably, the modulation technique utilized by the present invention is a 16-ary Quadrature Amplitude Modulation (16 QAM) scheme.

Herein, it will be assumed for illustration purposes that the number Nt of transmission antennas is 4 ($N_t=4$).

Upon receiving the input bit stream $b_1, b_2, b_3, b_4, \ldots$, the multiplexer 301 generates four parallel bit streams $S_1, S_2, S_3$ and $S_4$ by processing the input bit stream $b_1, b_2, b_3, b_4, \ldots$ in units of 8 bits. Each of the generated symbols includes two bits. In other words, bit stream $S_1$ represents input bits $b_1$ and $b_2$, bit stream $S_2$ represents input bits $b_3$ and $b_4$, bit stream $S_3$ represents input bits $b_5$ and $b_6$, and bit stream $S_4$ represents input bits $b_7$ and $b_8$. The generated bit streams $S_1, S_2, S_3$ and $S_4$ are input in parallel to the bit-order rearranger 303, and the bit-order rearranger 303 generates reordered bit streams $M_1, M_2, M_3$ and $M_4$, the number of which is equal to the number of its input bit streams $S_1, S_2, S_3$ and $S_4$, by performing mapped-reordering on the bits constituting the bit streams $S_1, S_2, S_3$ and $S_4$. In the bit reordering process, a first reordered bit stream $M_1$ is configured by sequentially ordering the input bits $b_1$ and $b_2$ constituting the first bit stream $S_1$ and the input bits $b_5$ and $b_6$ constituting the third bit stream $S_3$. A second reordered bit stream $M_2$ is configured by sequentially ordering the input bits $b_3$ and $b_4$ constituting the second bit stream $S_2$ and the input bits $b_7$ and $b_8$ constituting the fourth bit stream $S_4$. Similarly, a third reordered bit stream $M_3$ is configured by sequentially ordering the input bits $b_5$ and $b_6$ constituting the third bit stream $S_3$ and the input bits $b_1$ and $b_2$ constituting the first bit stream $S_1$, and a fourth reordered bit stream $M_4$ is configured by sequentially ordering the input bits $b_7$ and $b_8$ constituting the fourth bit stream $S_4$ and the input bits $b_3$ and $b_4$ constituting the second bit stream $S_2$. In conclusion, the reordered bit streams $M_1, M_2, M_3$ and $M_4$ have bit streams of $M_1=b_1b_2b_5b_6$, $M_2=b_3b_4b_7b_8$, $M_3=b_5b_6b_1b_2$, and $M_4=b_7b_8b_3b_4$, respectively. The configured reordered bit streams $M_1, M_2, M_3$ and $M_4$ are input to the modulator 305, and modulation modules constituting the modulator 305 modulate the reordered bit streams $M_1, M_2, M_3$ and $M_4$ into transmission symbols $X_1, X_2, X_3$ and $X_4$ using a 16-ary Quadrature Amplitude Modulation (16 QAM) scheme and transmit the transmission symbols $X_1, X_2, X_3$ and $X_4$ via their associated transmission antennas.

Although each of the reordered bit streams is created herein by sequentially ordering bits constituting two different bit streams, the number of bits constituting a bit stream, the number of bits copied from a bit stream, the number of bits constituting a reordered bit stream, the number of bit streams, from each of which bits constituting a reordered bit stream are to be copied, and the ordering sequence of the copied bit streams are subject to change according to system environment, and the change causes a change in diversity gain and data rate.

In addition, although 16 QAM is used herein as a modulation scheme, the embodiment of the present invention is not limited to this, and can also be applied to various modulation schemes, such as Quadrature Phase Shift Keying (QPSK) or 64 QAM.

As can be understood from the foregoing description, the novel data transmission apparatus and method can improve diversity gain while maintaining a data rate available in the conventional spatial multiplexing transmission scheme and can also increase a data rate while maintaining diversity gain available in the conventional spatial diversity transmission scheme, through a simple coding process using bit-order rearranging.

In addition, the novel data transmission apparatus and method can adjust multiplexing gain and diversity gain according to required system conditions without increasing system implementation complexity, thereby maximizing system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A transmitter in a multiple input multiple output (MIMO) communication system having multiple antennas, the transmitter comprising:
   a multiplexer for multiplexing an input bit stream into a plurality of bit streams, and outputting the plurality of bit streams in parallel;

a bit-order rearranger for reordering bits included in the plurality of bit streams that are output from the multiplexer in the same time period, and outputting reordered bit streams including the reordered bits, one of the reorder bit stream being generated by:
  copying at least two bits included in one of the output bit streams,
  copying at least two bits included in another of the output bit streams,
  generating a reordered bit stream including the copied at least two bits of the one output bit stream and the copied at least two bits of the another output bit stream; and
a modulator for modulating the reordered bit streams output from the bit-order rearranger so as to generate symbols according to their associated modulation schemes, and transmitting the symbols via their associated antennas.

2. The transmitter of claim 1, wherein the bit-order rearranger selects the plurality of bit streams which are output from the multiplexer in the same time period, in units of at least two bit streams, selects at least one bit in a predetermined bit position among bits included in each of the selected bit streams, and reorders the selected bits.

3. The transmitter of claim 1, wherein the copied at least two bits as they appear in each of the reordered bit streams are identical to the copied at least two bits as they appear in one of the output bit streams; and
  at least two bits of another copied bit stream as they appear in each of the reordered bit streams are identical to at least two bits of another copied bit stream as they appear in another one of the output bit streams.

4. The transmitter of claim 1, wherein the modulator comprises modulation modules to respectively modulate the reordered bit streams to generate the symbols according to respective 16-ary Quadrature Amplitude Modulation (16QAM) schemes, or respective Quadrature Phase Shift Keying (QPSK) schemes, or respective 64-ary Quadrature Amplitude Modulation (64QAM) schemes, and simultaneously transmit the symbols via the associated antennas.

5. A transmission method in a multiple input multiple output (MIMO) communication system, the transmission method comprising the steps of:
  multiplexing a serial input bit stream into parallel bit streams, which are output in the same time period;
  generating reordered bit streams, one of the reordered bit stream being generated by:
    copying at least two bits included in one of the parallel bit streams,
    copying at least two bits included in another of the parallel bit streams, and
    generating a reordered bit stream including the copied at least two bits of the one parallel bit stream and the copied at least two bits of the another parallel bit stream; and
  modulating the reordered bit streams according to associated modulation schemes so as to generate symbols, and simultaneously transmitting the symbols via associated antennas.

6. The transmission method of claim 5, wherein generating the reordered bit stream comprises:
  selecting parallel bit streams in units of at least two bit streams; and
  reordering all bits included in the selected bit streams.

7. The transmission method of claim 5, wherein the number of the reordered bit streams is equal to the number of the symbols.

8. The transmission method of claim 5, wherein the at least two copied bits as they appear in each of the reordered bit streams are identical to the at least two copied bits as they appear in one of the parallel bit streams; and
  at least two bits of another copied parallel bit stream as they appear in each of the reordered bit streams are identical to at least two bits of another copied parallel bit stream as they appear in another one of the parallel bit streams.

9. The transmission method of claim 5, wherein the modulating comprises respectively modulating the reordered bit streams to generate the symbols according to respective 16-ary Quadrature Amplitude Modulation (16QAM) schemes, or respective Quadrature Phase Shift Keying (QPSK) schemes, or respective 64-ary Quadrature Amplitude Modulation (64QAM) schemes.

10. A transmission method in a multiple input multiple output (MIMO) communication system, the transmission method comprising the steps of:
  multiplexing a serial input bit stream and outputting four bit streams in the same time period, wherein each of the four bit streams is constituted as two input bit streams;
  generating four reordered bit streams, each of the four reordered bit streams including two bit streams selected from among the four bit streams; and
  modulating the four reordered bit streams into symbols according to associated modulation schemes and simultaneously transmitting the symbols via associated transmission antennas;
  wherein one of the four reordered bit streams is generated by:
    copying at least two bits included in one of the four bit streams,
    copying at least two bits included in another of the four bit streams, and
    generating a reordered bit stream including the copied at least two bits of the one four bit stream and the copied at least two bits from the another four bit stream.

11. The transmission method of claim 10, wherein generating the one four reordered bit stream comprises:
  copying at least two bits in particular bit positions of the four bit streams; and
  reordering the copied bits in a predetermined order.

12. The transmission method of claim 10, wherein the copied at least two bits as they appear in each of the four reordered bit streams are identical to the copied at least two bits as they appear in one of the four bit streams; and
  at least two bits of another copied bit stream as they appear in each of the reordered bit streams are identical to at least two bits of another copied bit stream as they appear in another one of the four bit streams.

13. A transmitter in a multiple input multiple output (MIMO) communication system, the transmitter comprising:
  a multiplexer for multiplexing an input bit stream into symbols, and outputting the symbols in parallel;
  a bit-order rearranger for reordering bits included in the symbols, which are output from the multiplexer in the same time period, and outputting the reordered bits as mapped symbols; and
  a modulator for modulating the mapped symbols output from the bit-order rearranger according to associated modulation schemes, and transmitting the modulated mapped symbols via associated antennas;
  wherein the bit-order rearranger is configured to generate one of the mapped symbols by:
    copying at least two bits included in one of the output symbols, copying at least two bits included in another of the output symbol, and generating a mapped symbol including the copied at least two bits of the one output symbol and the copied at least two bits of the another output symbol.

14. The transmitter of claim 13, wherein the bit-order rearranger selects the symbols which are output from the multiplexer in the same time period, in units of at least two symbols, selects at least one bit in a predetermined bit position among bits included in each of the selected symbols, and reorders the selected bits.

15. The transmitter of claim 13, wherein the copied at least two bits as they appear in each of the mapped symbols are identical to the copied at least two bits as they appear in one of the output symbols; and two bits of a symbol other than a symbol of the copied at least two bits as they appear in each of the mapped symbols are identical to two bits of a symbol other than the symbol of the copied at least two bits as they appear in another one of the output symbols.

16. The transmitter of claim 13, wherein the modulator comprises modulation modules to respectively modulate the mapped symbols according to respective 16-ary Quadrature Amplitude Modulation (16QAM) schemes, or respective Quadrature Phase Shift Keying (QPSK) schemes, or respective 64-ary Quadrature Amplitude Modulation (64QAM) schemes, and simultaneously transmit the modulated mapped symbols via the associated antennas.

17. A transmission method in a multiple input multiple output (MIMO) communication system, the transmission method comprising the steps of:

multiplexing a serial input bit stream into parallel symbols, which are output in the same time period;

generating mapped symbols by reordering bits included in the parallel symbols; and modulating the mapped symbols according to associated modulation schemes, and simultaneously transmitting the modulated mapped symbols via associated antennas;

wherein generating mapped symbols includes generating one of the mapped symbols by:

copying at least two bits included in one of the parallel symbols, copying at least two bits included in another of the parallel symbols, and generating a mapped symbol including the copied at least two bits of the one parallel symbol and the copied at least two bits of the another parallel symbol.

18. The transmission method of claim 17, wherein the number of the mapped symbols is equal to the number of the parallel symbols.

19. The transmission method of claim 17, wherein the generating step comprises:

selecting the parallel symbols in units of at least two symbols;

copying at least one bit in a predetermined bit position among the bits included in each of the selected symbols; and ordering the copied bits in a predetermined order.

20. The transmission method of claim 17, wherein the copied at least two bits as they appear in each of the mapped symbols are identical to the copied at least two bits as they appear in one of the parallel symbols; and two bits of a symbol other than a symbol of the copied at least two bits as they appear in each of the mapped symbols are identical to two bits of a symbol other than the symbol of the copied at least two bits as they appear in another one of the parallel symbols.

* * * * *